(12) United States Patent
Wang et al.

(10) Patent No.: US 10,887,759 B1
(45) Date of Patent: Jan. 5, 2021

(54) DEVICE LOSS PREDICTION, PREVENTION, AND RECOVERY

(71) Applicant: International Business Machines Corporation, Armonk, NY (US)

(72) Inventors: Liwei Wang, Cary, NC (US); William Patrick Higgins, Durham, NC (US); ChunHui Y. Higgins, Raleigh, NC (US); Chul Sung, White Plains, NY (US); Bo Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/776,587

(22) Filed: Jan. 30, 2020

(51) Int. Cl.
| | | |
|---|---|---|
| H04W 4/029 | (2018.01) | |
| H04M 15/00 | (2006.01) | |
| H04W 8/22 | (2009.01) | |
| H04W 52/02 | (2009.01) | |
| H04W 88/02 | (2009.01) | |
| G06F 1/16 | (2006.01) | |

(52) U.S. Cl.
CPC ............ *H04W 8/22* (2013.01); *H04W 4/029* (2018.02); *H04W 52/0216* (2013.01); *H04W 88/02* (2013.01); *G06F 1/163* (2013.01); *H04M 15/58* (2013.01)

(58) Field of Classification Search
CPC ....... H04W 4/029; H04W 4/02; H04W 4/021; H04W 4/023; H04W 12/00503; H04W 4/025; H04W 12/08; H04W 12/1206; H04W 24/02; H04W 8/22; H04W 52/0216; H04W 88/02; G06F 21/88; G06F 21/50; G06F 21/554; G06F 1/163; H04M 15/58
See application file for complete search history.

(56) References Cited

U.S. PATENT DOCUMENTS

| | | | | |
|---|---|---|---|---|
| 6,067,018 | A * | 5/2000 | Skelton ................ | A01K 11/008 119/721 |
| 8,551,186 | B1 | 10/2013 | Strand | |
| 8,836,510 | B2 | 9/2014 | Brown | |
| 8,911,507 | B1 | 12/2014 | Gilbert et al. | |
| 9,031,536 | B2 | 5/2015 | Fitzgerald et al. | |
| 9,392,463 | B2 | 7/2016 | Anand | |
| 9,536,072 | B2 | 1/2017 | Guedalia et al. | |
| 2009/0210935 | A1* | 8/2009 | Miley ............... | H04W 12/1206 726/7 |

(Continued)

*Primary Examiner* — Daniel Lai
(74) *Attorney, Agent, or Firm* — Edward J. Wixted, III

(57) ABSTRACT

An artificial intelligence system monitors and records usage of a set of mobile devices that have been "paired" or grouped together. The system, over time, accumulates a history of times and locations associated with events that occur with respect to the devices. From this history, the system develops a usage model for the devices. The system, if it detects current usage diverges significantly from an expected usage, performs responsive actions which may include: notifying a user, via a paired device, that the mobile device may be lost or misplaced; command the "lost" mobile device to enter a reduced power state, to prolong battery life; and/or command the "lost" device to emit audible and/or visible signals intended to facilitate locating the device. In some embodiments, the system predicts an imminent loss of the device before it becomes lost, based on current usage vs. expected usage embodied in the model.

15 Claims, 2 Drawing Sheets

(56) References Cited

U.S. PATENT DOCUMENTS

| | | | |
|---|---|---|---|
| 2009/0325550 A1* | 12/2009 | Godon | H04L 67/24 455/414.1 |
| 2010/0203901 A1 | 8/2010 | Dinoff et al. | |
| 2013/0339019 A1* | 12/2013 | Giancarlo | G10L 15/1807 704/251 |
| 2016/0300049 A1* | 10/2016 | Guedalia | G06K 9/6272 |
| 2016/0360376 A1 | 12/2016 | Bostick et al. | |
| 2017/0127226 A1* | 5/2017 | Allen | H04W 4/029 |
| 2017/0161334 A1 | 6/2017 | Davis, III et al. | |
| 2019/0339989 A1* | 11/2019 | Liang | G06N 20/00 |

* cited by examiner

DEVICE LOSS PREDICTION, PREVENTION, AND RECOVERY

BACKGROUND

The present invention relates generally to the field of mobile device technology, and more particularly to the field of loss prediction, loss prevention, and recovery of a lost mobile electronic device.

Mobile devices include smartphones, smartwatches, podcast playback devices, laptop and tablet computers, activity trackers, accelerometers, pedometers, global position system (GPS) devices, virtual reality devices, smart eyeglasses, music players, biometric sensors, fitness devices, implanted identification chips (such as used for identification of pet animals), and mobile communication devices, to name just a few. Some devices (called "wearable devices") can be incorporated into clothing or worn by a user. Some devices can be incorporated into vehicles, for example, the technology console of a passenger vehicle.

SUMMARY

According to an aspect of the present invention, there is a method, computer program product and/or system for assisting with locating a first device, that performs the following operations (not necessarily in the following order): (i) tracking usage of a first device, the usage comprising a plurality of events occurring at a plurality of respectively corresponding times, and at a plurality of respectively corresponding locations, to establish a usage history; (ii) generating, by an artificial intelligence system operating in conjunction with a machine learning algorithm, a usage model based on the usage history; (iii) identifying, by comparing a current usage of the first device to the usage model, a difference between: (a) the current usage of the first device, and (b) an expected usage of the first device based on the usage model; (iv) assessing the difference against a potential device lost criterion to form a loss assessment; (v) determining the loss assessment exceeds a predetermined value; and (vi) in response to determining the loss assessment exceeds the predetermined value: (vii) providing a notification to a second device, wherein the notification includes (1) information that the first device has entered a lost state, and (2) information indicating a location where the first device was last used, and (viii) providing a signal commanding the first device to enter a battery-saving mode, and a location assistance mode.

DETAILED DESCRIPTION

Figure 1:
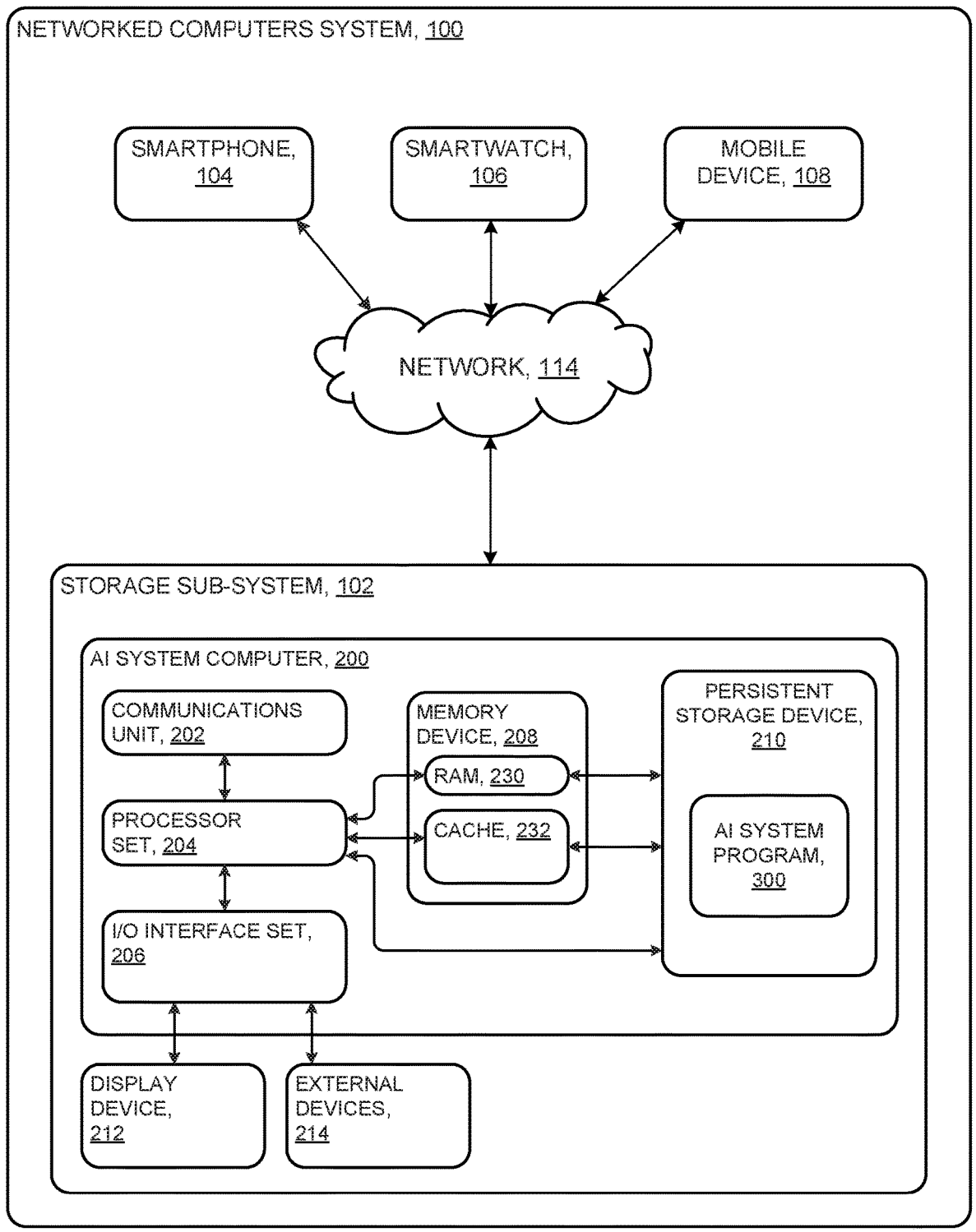
FIG. 1 is a block diagram of a system in accordance with at least one embodiment the present invention.

In some embodiments in accordance with the present invention, an artificial intelligence system (an AI system) monitors and records usage of a mobile device such as a smartphone or a smartwatch. The system, over time, accumulates a history of events associated with the mobile device, times at which the events occur, and locations where the events occur. From this history, the system develops a model of expected usage patterns. The system continues to monitor current usage of the mobile device and compares the current usage against expected usage patterns. If the system detects the current usage diverges significantly from an expected usage pattern, the system proactively performs responsive actions which may include: (i) notifying a user, via a different associated device, that the mobile device may be lost or misplaced; (ii) command the "lost" mobile device to enter a reduced power state, to prolong usable life of any remaining battery charge; and (iii) command the "lost" mobile device to emit audible tones, visible flashes, and/or radio frequency signals intended to facilitate locating the device. In some embodiments, the system predicts an imminent loss of the device before it becomes lost, based on current usage vs. expected usage embodied in the model, and takes proactive actions to inform the user that the device may be lost while the user is still nearby, and thus easily able to recover it.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: storage sub-system 102; smartphone 104; smartwatch 106; mobile device 108; communication network 114; artificial intelligence (AI) system computer 200; communications unit 202; processor set 204; input/output (I/O) interface set 206; memory device 208; persistent storage device 210; display device 212; external devices 214; random access memory (RAM) devices 230; cache memory device 232; and AI system program 300.

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. AI system program 300 is a collection of machine readable instructions and/or data that is used to create, manage, and control certain software functions that will be discussed in detail, below, in the Example Embodiment sub-section of this Detailed Description section.

Storage sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external devices 214 may be able to supply, some or all, memory for storage sub-system 102; and/or (ii) devices external to storage sub-system 102 may be able to provide memory for storage sub-system 102.

AI system program 300 is stored in persistent storage device 210 for access and/or execution by one or more of the respective computer processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

AI system program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with AI system computer 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, AI system program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
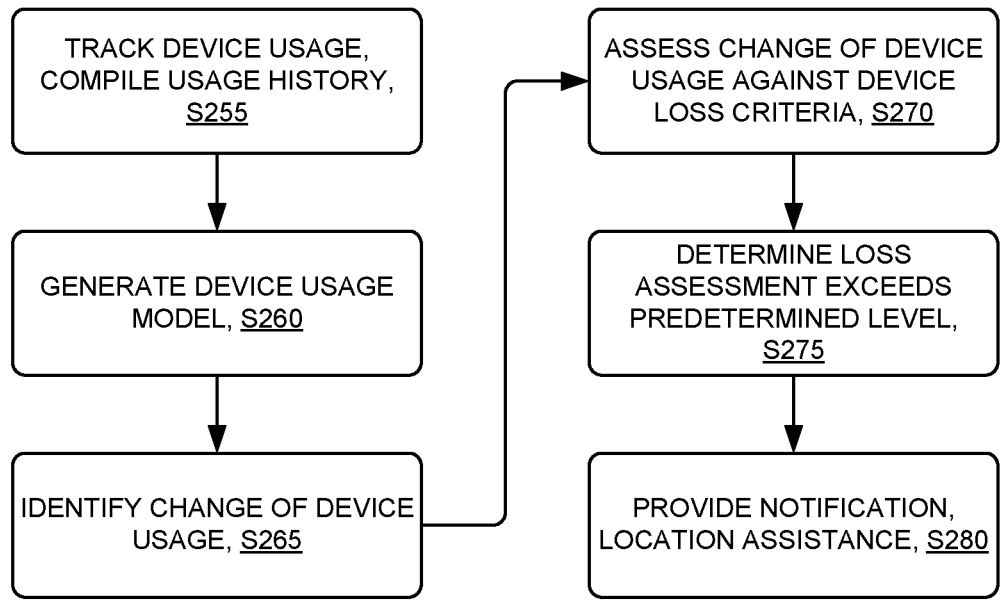
FIG. 2 is a flowchart showing a method performed, at least in part, in accordance with at least one embodiment the present invention.
Figure 3:
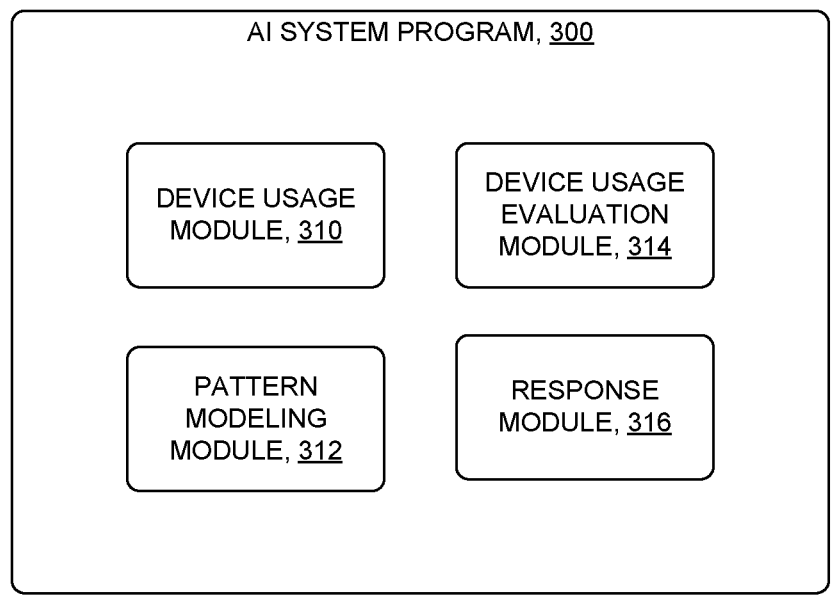
FIG. 3 is a block diagram showing a machine logic (for example, software) portion of a system in accordance with at least one embodiment the present invention.

FIG. 2 shows flowchart 250 depicting a method according to the present invention. FIG. 3 shows AI system program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where device usage module 310, of AI system program 300, tracks device usage. More information is given below under the sub-heading "1. Data Collection", in the Further Comments and/or Embodiments sub-section of this Detailed Description section.

In some embodiments, the device may be any computing device capable of data communication, including wireless communication, whether capable of one-way (for example, receive only, such as a radio receiver) or two-way (for example, receive and transmit, such as a smartphone) communication. While some embodiments of the present invention are directed to mobile devices such as smartphones, fitness trackers, tablet computers and the like, nothing in this specification should be interpreted to exclude stationary devices as well. One example of a machine that could be considered to be a stationary device in accordance with some embodiments of the present invention, is a snow removal machine fitted with a GPS receiver/radio transmitter. Other examples of stationary devices are desktop, floor-mounted, or rack-mounted computers, audio equipment, ham radio equipment, televisions, home theater equipment, etc. Some embodiments of the present invention help to track and locate mobile devices and stationary devices. For further reference, see definitions for "Data Communication", "Computer/Mobile device" and "Mobile device" in the Definitions sub-section of this Detailed Description section.

Processing proceeds at operation S260, where pattern modeling module 312, of AI system program 300, generates a computer model based on the device usage history collected in operation S255 above. In some embodiments, pattern modeling module 312 refines and/or reconfigures the computer model, based on ongoing tracking of the device usage, and changes therein that may take place over time. More detailed information is given below under the sub-heading "2. Pattern Recognition and Model Generation", in the Further Comments and/or Embodiments sub-section of this Detailed Description section.

Processing proceeds at operation S265, where device usage module 310 continues to monitor ongoing current device usage. Device usage evaluation module 314, of AI system program 300, evaluates current device usage (gathered by device usage module 310) in view of the computer model generated in operation S260 above, to identify a change (a deviation) in the current device usage vs. expected usage based on the computer model. The current usage evaluation module assigns a magnitude to the deviation to quantify how significant any such deviation is.

Processing proceeds at operation S270, where device usage evaluation module 314 assesses the deviation against a loss criteria. The loss criteria quantifies the deviation such that a threshold can be established. If the deviation exceeds the threshold, AI system program 300 determines that the device is in a "lost" state.

Processing proceeds to operation S275, where current usage evaluation module 314 determines the device is in a "lost" state.

Processing proceeds to operation S280, where response module 316, of AI system program 300, responds by performing an action or set of actions designed to help an individual to locate the "lost" device. In some embodiments, the set of actions includes: (i) providing a "loss notification" to a second device associated with the lost device (associated for example, by being owned by the same individual, and/or having been paired with the lost device); (ii) triggering the lost device to enter a low power usage state to prolong useful battery life; and/or (iii) putting the lost device into a "location assistance" mode whereby it periodically emits an audible signal (such as a recurring "beep"), a visible signal (such as a stroboscope-like flash), and/or a radio frequency localizer signal that can be received and interpreted by a suitable device. More detailed information is given below under the sub-heading "(2)(f) Provide Location Assistance" in the Further Comments and/or Embodiments sub-section of this Detailed Description section. In some embodiments, response module 316 triggers a "lost" device to disable itself with respect to normal device functionality (but leaving active any location assistance functionality), rendering it useless to anyone who lacks a predefined re-enabling key or code of some sort.

By way of an example, consider a scenario where user wearing a fitness tracking device goes to a gymnasium every Saturday. The usage model indicates that the length of time the fitness tracker is inside the gym follows a Gaussian ("normal") frequency distribution with a mean of 60 minutes and a standard deviation of 3 minutes. In this model, it is 99.7% probable that the device will be in the gym on Saturday for between 51 and 69 minutes (based on calculation of the mean+/−3 standard deviations). The owner exits their vehicle in the parking lot and proceeds into the gym. The wristband of the device breaks, unnoticed by the owner, as the owner enters the establishment, and the device falls to the floor, just inside the entryway. Another visitor on the way out finds the device on the floor and claims it as their own, taking it away.

In this scenario, the loss criteria thresholds (there are two thresholds in this example, a lower and an upper threshold) are 51 minutes, and 69 minutes. That is, if the device is in the gym for less than 51, or more than 69 minutes, the device is deemed to be in a "lost" state. In response, response module 316 triggers one or more actions, to be performed by the lost device and/or any number of other companion devices to: (i) alert the user of the potential loss; (ii) disable normal functions of the fitness tracker, and/or (iii) display, by the fitness tracker, an informational message stating that the functions of the device have been disabled, to encourage the finder to turn it in at the front desk as a "lost and found" item, rather than keeping it.

If, however, the device did not fall off the owner's wrist, but the owner had a reason to exit the gym immediately after entering, that by itself, in some embodiments, might also trigger the "lost" state. But the owner is in possession of a second "companion" or "buddy" device, a smartphone for example, which has been paired with the fitness tracker. Device usage evaluation module 314 detects that the fitness tracker and smartphone remain in close proximity to each other, and thus determines that the fitness tracker is not lost, does not trigger the "lost" state, and no responsive actions are called for.

III. Further Comments and/or Embodiments

Some embodiments of the present invention may recognize one, or more, of the following facts, potential problems, and/or potential areas for improvement with respect to the, the current state of the art for electronic devices, including wearable devices: (i) factors such as small size and light weight mean some devices may be easy to misplace or lose; and/or (ii) limited battery energy reserve (due, for example, to small batteries, batteries already having low charge when lost, or no batteries at all), mean such a device may not be capable of announcing its location (for example by emitting audible beeps, producing a visual notification such as with blinking lights, or transmitting an electronic signal useful in locating the device) for useful lengths of time.

In some embodiments of the present invention, an artificial intelligence system (AI system) uses data science methods to identify anomalies in the usage patterns of a user's mobile device such as, for instance, a cellphone, smartwatch, a wearable device, a smart vehicle, etc. The AI system uses data science to predict a potential loss of a device. Once the system detects an anomaly in the usage pattern of the device, the system proactively notifies the user as to a potential or actual loss of the device. Thus informed, the user can prevent the loss from happening, or may more easily find the device if it is lost, misplaced, etc.

Some embodiments, proactively generate an intuitive workflow, based on events logged over a "training interval" (sometimes herein referred to as a "training period"). During the training period, a sensor data module, working in conjunction with a pattern module, records certain events with respect to a device, such as start and stop times in certain configurations, device temporal location history, etc. The pattern module discerns patterns of usage. The pattern module also receives information for grouping a set of devices owned by a user into a "device set". Then, for devices included in the device set, the system correlates respective usage patterns to discover patterns of interaction among the devices of the group.

The pattern module can detect a deviation from an established pattern. Once the pattern module detects a deviation, it interacts with a response module whereupon the response module performs one or more responsive actions. Potential responsive actions include, without limitation: (i) issuing an alert to the user by, for example, sending a notification message for display, and/or audio output, on one or more devices of the device set; (ii) issuing a loss prediction alert message to one or more devices of the device set; (iii) causing the "lost" device to emit a localizer signal, such as a periodic flash, beep, and/or radio-frequency transmission; and/or (iv) disabling the "lost" device until it is reclaimed by the owner.

To illustrate, consider system in accordance with some embodiments of the present invention, where the system has purview over three devices owned by a user. Through interaction with the system, the user has grouped the devices together into a device set comprising: a cellphone, a smartwatch, and a music player. A pattern module of the system performs separate training periods to discover and record usage patterns for each respective device, as well as interactions among and between the devices of the device set. For this example scenario, one particular pattern emerges wherein the user often carries the cellphone and smartwatch together during work days. Then on three evenings each week, she carries the cellphone, smartwatch, and music player together during workouts at a fitness center.

Now suppose the user puts the three devices in a locker. After her workout, she retrieves from the locker, the cellphone and music player but inadvertently leaves behind the smartwatch. She exits the fitness center. The pattern module detects this deviation from the established pattern that has all three devices always entering and exiting the fitness center together. In response, a response module of the system sends an alert signal to all devices of the device set. The signal received by the cellphone causes the cellphone to display a message indicating the smartwatch may have been forgotten at the fitness center. The signal received by the music player causes the music player to interrupt the music currently being played (and listened to by the user) and interjects a voice message indicating the smartwatch may have been forgotten at the fitness center. The signal received by the smartwatch (the "lost" device) begins to emit an audible beep once every ten seconds, and displays a message indicating that it is considered lost, and will be disabled until recovered by the rightful owner, to discourage anyone who finds it from claiming it for themselves. The smartwatch further enters a battery life extending mode, wherein any applications that are not required to perform functions in accordance with embodiments of the present invention are stopped.

The user, about to exit the fitness center parking lot, hears the voice message through the music player earbuds, and sees the message displayed on the cellphone. She returns to the fitness center and retrieves the smartwatch thus avoiding the potential loss of the device.

In some embodiments of the present invention, the system resides in the mobile device. In some embodiments, the system resides at a central location such as a server computer, in which case device-server communications are enabled and take place according to circumstances. In some embodiments, system components are distributed among more than one device and/or server computer.

In some embodiments of the present invention, an AI system: (i) builds device usage pattern event profiles, based on one or more training periods; (ii) once patterns emerge, detects usage anomalies (deviations from the learned patterns); (iii) predicts potential loss of a device based on detected anomalies; (iv) provides potential loss alerts; and/or (v) provides assistance in locating a "lost" device.

With respect to item (i) in the paragraph above, in some embodiments, a training period (learning phase) comprises initial and/or ongoing learning of the device usage patterns.

In some embodiments, even after patterns have begun to emerge, the AI system continues to learn indefinitely, refining the learned patterns, and adapting to changes in usage patterns over time. In some embodiments, the "learning phase" comprises a rolling time period, for example a rolling six-month period, where once six months of data has been collected, the oldest month's data is discarded when a seventh month's data has been collected, and so on indefinitely. In other embodiments, the learning phase remains ongoing until directed otherwise, for example by user input. In still other embodiments, the learning phase has a finite duration after which the data gathered during the learning becomes static. In some embodiments, the AI system employs some or all the aforementioned types of learning phases (and any other types as well) in conjunction with each other, and in any combination as deemed appropriate for various types of usage patterns. For example a usage pattern associated with daily evening exercise sessions might be based on a rolling three-month basis, wherein the user's exercise sessions vary with the seasons (indoors during winter months and outdoors during the summer). In contrast, the AI system might conduct the learning phase associated with online banking transactions for the purpose of paying monthly utility bills, for instance, for one year only, and simply monitor for any usage pattern change. If a pattern change is detected, the AI system reinstates a learning period to adapt to the new pattern.

In some embodiments, a device allows for multiple patterns to be learned. For example, the device learns a set of usage patterns while being carried by a first individual, and learns a second set of usage patterns associated with a second individual. In some embodiments, there may be an unlimited number of usage patterns associated with a respectively corresponding number of individuals.

In some embodiments, a user can establish more than one set us usage patterns. For example, the user may direct the device to learn a usage pattern associated with: (i) a work day; (ii) a non-working day; (iii) a business travel day (may be useful for an individual who frequently travels for business); (iv) a vacation trip, etc., to name just a few examples.

In some embodiments, a device records how and when it is used. Over time, as patterns emerge, the device stores one or more pattern profiles. Once a pattern is identified, the device can detect deviations from the pattern (sometimes herein referred to as an anomaly). Based on a usage anomaly (a deviation from an established usage pattern), the device can recognize when it may be "lost" or may be about to be "lost".

In some embodiments, an imminent loss prediction is based on a probability calculation, based on certain deviations from the learned usage patterns. Aspects of learned usage patterns include temporal factors such as geographical position, acceleration patterns, on/off times, received user commands, biomedical information from sensor input (such as user heart and respirations rates, blood pressure, blood oxygen saturation levels, etc.), separately and/or on combination with each other. Patterns can also include a lack of certain information. For example, a flow of biomedical information derived from sensors on the device may cease once the user takes off the device. The pattern processing algorithm takes into account this stoppage in the flow of certain information, in this example, biomedical information.

In some embodiments, after a sufficient number of days where the device records usage parameters, the device starts to identify short-term usage patterns (for example, daily usage patterns). After a sufficiently greater number of days, the device is able to identify longer-term patterns (for example, weekly and/or monthly usage patterns). These short- and long-term patterns may be superimposed on one another. For instance, a person might use a smartphone as a podcast playback device every morning during a morning walk and then use the smartphone throughout the work day at random times, and at certain regular times (for example, daily conference calls with team members working remotely). The smartphone would log these events and record the patterns.

In some embodiments, multiple devices operate in conjunction with one another to establish certain patterns. For example, consider a user who uses a smartphone and a smartwatch. Both devices communicate with each other (for example linked together using near field communication, (NFC) or other techniques). Patterns of usage for the smartphone include information exchanged with the smartwatch, and vice versa.

For example, consider a pattern where the smartphone is generally in communication (via NFC) with the smartwatch during a time span from 06:00 to 07:00 am on weekends, because the user goes on a morning jog while carrying the smartphone and wearing the smartwatch. One Saturday morning during the usual jog, the wristband breaks and the smartwatch falls off. The smartphone, detects the unexpected break in communication with the smartwatch. The smartphone sounds an audible alert signal. Responding to the sound, the user looks at the smartphone to see a message displayed stating that the smartwatch may have been lost within the preceding minute. The user retraces his or her steps, and recovers the smartwatch on the ground.

If the usage of the smartphone deviates from some patterns beyond a certain threshold (for example, for longer than one day, or separated from an associated device by more than a threshold distance), the smartphone proactively triggers a "potentially lost" event and initiates a subsequent workflow to help the user find the associated device.

In some embodiments, a device sends pattern data to another device (a "buddy" device), computer, or cloud service, etc., both to store events and to detect patterns. Artificial intelligence algorithms, carried out in whole or in part by the device, the buddy device, the computer, or residing in the cloud service, working separately or in conjunction with one another, determine and model the patterns and detect deviations therefrom.

In some embodiments of the present invention, an artificial intelligence (AI) system performs the following operational phases: (1) Data Collection; (2) Pattern Recognition and Model Generation; (3) Anomaly Prediction and/or Detection; (4) Anomaly Notification/Alarm Triggering; and/or (5) Location Assistance. There may be significant overlap between and among the phases. For instance, in some embodiments, data collection and pattern recognition are ongoing and continue indefinitely (even after the other phases have come into effect) in a process of continual refinement of the pattern recognition, and to adapt to pattern changes. These operational phases are discussed in more detail below.

1.

Data Collection. In some embodiments of the present invention, an AI system builds one or more user's communications profiles, based on relevant communication information (events), including information (with example event names) such as the following metrics:

(i) location and time when a call or media player starts ("start call" or "start media"). In some embodiments, the AI system associates a phone number, and whether each call is incoming or outgoing, with each "start call" event, for fine-grained pattern recognition with respect to phone calls. Media (and recording of events related thereto) can be further categorized as "music", "podcast", "live stream", "movie", "television show", etc. and each category can be further broken down by name of the music selection, podcast, movie, etc. For example, suppose the device user listens to Allegro de Concert, composed by Frederick Chopin, Opus 46. In some embodiments, the events recorded by the AI system are be named "start media Chopin op46 time location" and "stop media Chopin op46 time location", thereby providing information for pattern recognition by the AI system, such as at least media player start and stop times and corresponding locations, composer, music composition. Further, in some embodiments, the AI system has access to public knowledge databases. The system searches and collects more information associated with the selections played on the media player, such as at least genre, musical period (baroque, classical, romantic, modern, popular), etc. In some embodiments, the AI system allows the user to indicate a level of granularity (or automatically sets a default granularity level) of data collected and/or utilized in recognizing usage patterns. In some embodiments, the AI system collects as much event data as it can, to enable the finest granularity, yet utilizes a selectable granularity level when developing usage patterns. In some embodiments, the granularity is user selectable, and can be changed retroactively, to increase or decrease the granularity used in developing usage patterns, to find a suitable balance between sensitivity and noise, and consequently to find a suitable balance between false positive and false negative states of alarm. In some embodiments, media events include incoming and outgoing text message events, near field communication events (including a record of data exchanged), events associated with biomedical metrics, and other miscellaneous events.

(ii) location and time when a call or media player ends ("stop call" or "stop media");

(iii) location and time when charging starts ("start charging");

(iv) location and time when charging stops ("stop charging");

(v) location and time when entering a wireless local area network (LAN) ("enter wireless LAN network_name"). Entering a wired network is treated similarly;

(vi) location and time when exiting a wireless LAN ("exit wireless LAN network_name");

(vii) location and time when starting an exercise mode ("start exercise");

(viii) location and time when stopping an exercise mode ("stop exercise");

(ix) location and time when global positioning system (GPS) is started, includes GPS route info ("start GPS");

(x) location and time when GPS is ended, includes GPS route info ("stop GPS");

(xi) location and time when the battery is below a threshold (example, below 20% charge) ("low battery");

(xii) location, time, and a paired device name when near field communication (NFC) device is paired ("start pairing NFC paired_device_name")

(xiii) location, time, and the paired device name when NFC device is unpaired ("stop pairing NFC paired_device_name");

(xiv) duration of each event;

(xv) recency of each event;

(xvi) lifetime of the battery (discharge rate), for example, from fully charged to 50%;

(xvii) frequency of each event;

(xviii) durations, times, and other aspects of idle time (time between activities);

(xix) event sequence;

(xx) location sequence;

(xxi) calendar information. Consider a user's calendar entry for a business appointment in a distant city. In some embodiments, an AI system correlates the calendar entry with the pattern of various events (see event examples above) discovered by the AI system in the learning phase. The pattern of events do not include the device being moved to the distant city. In the absence of the calendar information, the AI system, having detected that the device has been moved to the distant city, may trigger a loss alert notification. However, by correlating the device location with the calendar information, the AI system determines a loss probability that is below an alert threshold, and therefore, a loss alert is not warranted;

(xxii) temporal information structured into two components: absolute pointwise time and relative pairwise time which means the time interval between sequence events for any given time window (such as per hour, day, week, etc.).

For the absolute pointwise time, the AI system, in some embodiments, divides a day into regular intervals (such as into 24 hour-long intervals). The AI system checks each interval for any user activities. For instance, consider a day divided into six four-hour windows. The AI system checks for any activity between 12:00 am and 04:00 am and counts the number of activities (recorded events, for example). The AI system does this for each of the six four-hour windows (12:00 am (midnight)-04:00 am, 04:00 am-08:00 am, 08:00 am-12:00 pm (noon), 12:00 pm-04:00 pm, 04:00 pm-08:00 pm, and 08:00 pm-12:00 am). The data comprises absolute pointwise time-based activities. In some embodiments, the AI system learns patterns of absolute pointwise data (and establishes corresponding loss alarm trigger thresholds), specific to respectively corresponding days (such as one loss alarm trigger established for weekdays, a second loss alarm trigger for weekend days, and a third loss alarm trigger for vacation days). In some embodiments, the AI system automatically divides days into any number of intervals, such as 24 hour-long intervals, 48 30-minute intervals, based on patterns of activity observed over a learning period. In some embodiments, the AI system divides days into any number of intervals based on user input. In some embodiments, the AI system superimposes multiple intervals on the absolute pointwise data to enable finer or coarser temporal granularity as circumstances may indicate.

For relative pair-wise time, the AI system establishes rolling time intervals, such as a rolling hour-long interval ending at the current time.

(xxiii) sensor data from devices. Based on sensor data, the AI system recognizes when a device is attached to a user, and when the device is not. In some embodiments, the AI system, based on sensor data and/or activities, recognizes to which wearer the device is attached. Once the wearer is identified, the AI system collects data for pattern learning, and applies loss detection and consequent alarm triggering, based on data and patterns associated with the particular wearer. Note, attachment of a device to a wearer simply means the user carries, wears and/or otherwise has possession of the device.

2. Pattern Recognition and Model Generation.

In some embodiments of the present invention, an AI system uses data science (DS) approaches (such as data analysis, data modeling, statistics, machine learning, etc.) to analyze information collected, as described above under the sub-heading "1. Data Collection". A goal of the data analysis is to extract (to recognize) patterns of usage with respect to a mobile device, and to generate a computer model based on the patterns. In some embodiments, the data collected comprises structured data, unstructured data, or a combination of structured and unstructured data. The usage patterns provide a basis on which to evaluate current ongoing usage of a mobile device to determine whether the current ongoing usage comports with, or departs from, the established (known) patterns.

In some embodiments of the present invention, an AI system analyzes ongoing device events (aspects of device usage) and identifies deviations from the device usage patterns established or discovered, as detailed above under the sub-heading 2. Pattern recognition. A deviation is herein referred to as an anomaly. The AI system analyzes the collected information and ongoing device usage, and uses DS methods to: (i) predict whether the mobile device may potentially be (in the near future) lost; and/or lost, stolen, misplaced, or otherwise not available to a user when desired (sometimes herein referred to as being in a "lost state").

Once a sufficient amount of data has been collected, the AI system begins to recognize and model emergent device usage patterns. The AI system defines a "normal region" (meaning usage behavior that conforms to usage patterns already recognized and/or modelled). The AI system then applies data science techniques to monitor, and respond appropriately to ongoing mobile device usage. In some embodiments, the AI system performs one or more of the following operations with respect to a mobile device ongoing usage, loss prediction and/or detection, and recovery assistance: (a) Observe Active vs. Idle Time; (b) Build Spatial Model; (d) Detect Multivariate Outliers; (f) Provide Location Assistance.

(a) Observe Active vs. Idle Time.

In some embodiments, the AI system recognizes patterns based on historical data collected with respect to when the device is in regular active use, and when the device is regularly switched off, coupled to a battery charging device, idle and/or not in use. Consider a case where the AI system determines that the device is regularly in use between the hours of 8:00 am and 10:00 am every day. On one particular day, the device is idle during that time window. A default (or user selectable) tolerance of plus or minus 1 hour has previously been established. The AI system watches to determine if the device is in use during a time window between the hours of 7:00 am and 11:00 am (starting 1 hour before the beginning of the usual usage pattern, and ending 1 hour after the end). On detecting that the device is not in use during the time window (7:00 am to 11 am), the AI system thus determines that a significant deviation (an anomaly) from the 8:00 am to 10:00 am usage pattern has occurred. Discussion of possible AI system response to such a deviation is given below under the sub-heading (e) Provide anomaly notification/trigger alarm.

In some embodiments of the present invention, the data model developed as described above under the sub-heading 2. Pattern recognition, considers the length of time a device has been used by pairing the device to one or more "buddy" devices (for example, a smartwatch paired in communication with a smartphone via near field communication). In some embodiments, the AI system considers the level of consistency observed for the active/idle pattern over time, and deviations from the pattern, to determine if an anomaly has occurred.

In some embodiments the AI system uses a statistical model where 0 and 1 represent "device idle" and "device active" respectively. The model divides a day into any number (n) of time segments, and generates a vector, for example vector X, where $X=[x_1, x_2, \ldots, x_{n-1}, x_n]$. For example, in a given scenario, the vector may appear, in part, as $X=[0, 0, 0, \ldots, 1, 0, 1]$. Each element in the vector ($x_n$) represents "device idle" or "device active" respectively as 0 or 1, for corresponding time segment n. Then, over time (for example, over a number of days), each element of vector X emerges to represent the probability that the device is expected to be "idle" or "active" for the corresponding $n^{th}$ time segment each day.

In some embodiments, the AI system calculates an average (arithmetic mean) of the values for each time segment observed during a learning phase. In other embodiments, the AI system uses other approaches to characterize or summarize the data for each vector element (that is $X_1$-$X_n$). For example, the AI system calculates a time weighted mean, or a probability function with mean and standard deviation. In some embodiments, the AI system characterizes the data for each vector element independently, where the characterization applied to each element is not necessarily the same as that applied to the other elements.

Irrespective of how the AI system characterizes the vector elements corresponding to a usage pattern of a mobile device, the vector provides a basis for predicting, with m probability, that the mobile device during a given time segment n (represented by a corresponding to an $n^{th}$ vector element) would be active (the $n^{th}$ vector element=1) and with 1−m probability the mobile device would be inactive (the $n^{th}$ vector element=0). Determining whether a mobile device is in an active or inactive state may be determined by various means, based for example on whether the device is currently being used by, worn by, carried by, or accompanying the user, powered on or off, in communication with another device, coupled to a battery charging device, being moved about by any means, and/or any number of other characteristics that can be determined by, or communicated to, the AI system.

For example, consider that during a particular time segment n (represented by the $n^{th}$ vector element) on a given day, the AI system has determined that a mobile device has a high probability of being in an active status (the $n^{th}$ vector element, averaged over time, is greater than a threshold probability, for example 0.9). But during the particular time segment on the given day, the AI system determines the device is idle, which is contraindicated by the $n^{th}$ vector element. The idle condition of the device therefore is an anomalous condition. In response, the AI system may perform at least one of the following actions: (i) enter an alert state and trigger an anomaly signal; or (ii) enter a pre-alert state. In the pre-alert state, the AI system monitors the anomalous condition for a threshold amount of time, after which the AI system upgrades the pre-alert state to the alert state. Once in the alert state, the AI system triggers an anomaly signal in response.

In some embodiments, the AI system generates data structures, such as the vectors discussed above, to characterize factors related to usage of a mobile device. The AI system couples some of the factors with temporal information such as time of day, day of week, day of month, day of year, etc. Example factors include, without limitation: (i) device movement patterns (such as between a user's home, shopping, errand, and work locations), including not only locations, but routes traveled, velocities, etc.; (ii) communications between the mobile device and other mobile devices, commercial radio stations, WiFi (wireless network protocol) access points, the internet, etc.); (iii) battery charging patterns; (iv) patterns of biometric states of one or more authorized users; (v) patterns of pairing with other devices, for example near field communication between a smartphone and a smartwatch or vehicle system; and/or (vi) patterns of being powered down vs. powered up, idle vs. active, or stationary vs. mobile, to name a few. In some embodiments, the AI system characterizes these, and any number of other factors, with vectors, arrays, graphs, database records, and/or any other practicable data structure. (Note: the term "WiFi" may be subject to trademark rights in various jurisdictions throughout the world and are used here only in reference to the products or services properly denominated by the marks to the extent that such trademark rights may exist.)

(b) Build Spatial Model.

In some embodiments, the AI system builds and stores a spatial model that includes information correlating location and usage with respect to a mobile device (herein referred to as location/activity usage information). In other words, the spatial model correlates usage information derived, for example, from various sensor inputs such as position, accelerations, duration, orientation, communications with other devices, etc., with the physical location (such as GPS coordinates) where those activities take place. In some embodiments, the AI system groups various locations into categories, such as (the user's) home, grocery store, work location, fitness center, bicycle or jogging route, park, and any number of other categories.

The AI system discerns mobile device usage patterns as they develop over time in the spatial model. The AI system continues to receive ongoing location/activity usage of the mobile device, and evaluates the incoming information against the pattern information stored in the spatial model. If the AI system detects a deviation between current usage and one or more patterns based on the spatial model, the AI system may enter a pre-alert state, or an active alert state. In a pre-alert state, in some embodiments, the AI system starts a timer. If the anomaly persists until the timer reaches a threshold value, the AI system enters the active alert state. In the active alert state, the AI system responds by issuing one or more alarm notifications (to one or more devices) or any other response designed to alert the user. Under some circumstances, the AI system activates a location assistance function (described below under the sub-heading (P Provide location assistance.

In some embodiments, the AI system runs a separate analysis to detect unusual idle events, such as if the mobile device is motionless at a time, and in a location, where an established usage pattern indicates that the mobile device has a low probability of being motionless.

In some embodiments, the AI system enters a pre-alert or alert state if the device becomes unpaired from a "buddy" device at a time and/or place where usage pattern indicates that the device is usually paired to the "buddy" device. The AI system similarly enters a pre-alert or alert state if the system determines the device is in a location that it has never previously been to.

(c) Sequence Data, Patterns of Interaction Among Devices.

In some embodiments, multiple devices are used in regular patterns (herein referred to as combination patterns). For example, consider a smartwatch that is regularly worn by a user and is generally in near field communication with a smartphone, also regularly carried by the user. In some embodiments, a user "ties" multiple devices together as a group, designating the devices as related to each other. Patterns of usage among the related devices, with respect to each other, may constitute frequent daily behavioral patterns which are recognized and modelled by the AI system. For example, everyday a user may have the same habit to charge a wearable device around 9 pm and he or she may go to a gymnasium and workout at approximately 6 pm every day. Taken together, the AI system recognizes the two events (charge the wearable device and workout at the gym), as a user's daily habit pattern.

(d) Detect Multivariate Outliers.

Some embodiments of the present invention perform the following operations: 1) compute a density estimation of the whole data set for the metrics listed in step 1 (see 1. Data Collection above) based on the historical data. Some embodiments assume a gaussian distribution given the dimension is very high; 2) calculate the likelihood of the current data based on the density estimated; 3) perform a multiple hypothesis testing procedure to identify if the current data is abnormal.

(e) Provide Anomaly Notification/Trigger Alarm.

In some embodiments, the AI system triggers an alarm (initiates an anomaly notification) in response to detecting that an aspect of current usage is sufficiently deviated from an established, relevant usage pattern. In some embodiments, this part of the solution builds upon the second through proactive alerting. Even if the device might "think" it is lost, the device may rely on the owner's assistance to potentially be found. When the device triggers a "potentially lost" event, the device posts this event to a "buddy" device or cloud service, previously configured either by the device vendor (for example, as a default) or based on user input. In some embodiments, the "buddy" device asks the user to acknowledge the event by either agreeing that the device is lost or by dismissing the alert. If the alert is dismissed it will still be available in an archive in case the dismissal was accidental. If the user agrees that the device is lost, the AI system initiates location assistance. (See (f) Provide Location Assistance below.)

In some embodiments, once the AI system goes into an alert state, the system provides a feedback means whereby the user can indicate the alert is legitimate, or a false positive. In response, the AI system modifies corresponding usage patterns, to lessen the future occurrence of false positives. Conversely, if a device is in fact lost but the AI system does not trigger a loss response, the user can provide input to the AI system where, in response, the AI system modifies any corresponding usage pattern(s) to lessen the future occurrence of false negatives.

(f) Provide Location Assistance.

In some embodiments, the AI system provides location assistance based on historical information, and if available, localizer signals transmitted by the "lost" device. In addition, the AI system provides real-time interactive help such as the following:

(i) Provides historical information to the user, including such things as the last location where the device was used, the location to where the device was last moved, etc.

(ii) Puts the "lost" device into a battery saving mode, keeping active only minimal functionality (including functionality associated with providing location assistance).

(iii) Based on historical device location data over recent days past, the AI system suggests potential locations of the "lost" device, based on sequence analysis. For example, if last location reported is location "A", the AI system identifies (based on mining of the historical data, for example) locations "B", "C", etc., in decreasing order of likelihood that the user may have moved the device to, and notifies the user via a "buddy" device.

(iv) Provides locations to the user (for example, last place used, last place moved to, etc.) as memory aids, to help trigger a memory about a situation that caused the user to absentmindedly leave the device in an unusual place. In some embodiments, the AI system provides the locations to help the user get close enough to the device to enable effective interactive location assistance. For example, if the user is at home and the last location of the device is somewhere at work 10 miles away, the user may first drive to work before the AI system continues providing interactive help. Once the user is fairly close to the "lost" device, (for example close enough to hear an audible signal emitted by the device), the AI system provides interactive help using a combination of optional wearable audio help as well as audio and visual help in a "buddy" (paired companion) device application (for example, a smartphone). If the lost device has a speaker, the AI system causes the device to make a repeating, distinct, audible "ping" to help the user locate it. The companion device communicates with the wearable using various wireless technologies (Bluetooth (wireless, short-distance communication), and/or WiFi) to determine fine-grained distance between the companion device and the wearable. In some embodiments, an application on the companion device then provides audio, visual, and textual indications to help the user determine if the use is getting closer or farther away from the "lost" device. (Note: the terms "Bluetooth" and/or "WiFi" may be subset to trademark rights in various jurisdictions throughout the world and are used here only in reference to the products or services properly denominated by the marks to the extent that such trademark rights may exist.)

For example, consider a smartphone that is accidentally dropped to the ground in a grocery parking lot, and remains there for a threshold amount of time, such as 30 seconds. In this example, a paired device, for instance, the AI system operating in conjunction with a motor vehicle technology console, and/or a smartwatch worn by the user, detects the anomaly and enters an active alert state. The AI system displays and/or sounds a warning message via the vehicle technology console and/or the smartwatch to alert the user that the smartphone may be lost as of 30 seconds earlier. The user remembers that he or she had just then finished packing the groceries into the vehicle. The user returns to the parking space and recovers the smartphone.

In some embodiments, a method for assisting with locating a device comprises (i) tracking usage of the device to form a history wherein the history includes events E ($E_1$, $E_2$, ..., $E_n$) occurring at times T ($T_1$, $T_2$, ... $T_n$) and at locations L ($L_1$, $L_2$, ..., $L_n$), to form an established usage history; (ii) applying artificial intelligence (AI), and machine learning (ML) to the established usage history to form a model associating usage events with times and locations; (iii) comparing a current usage of the device to the model to identify a change of usage from the established usage history; (iv) assessing the change of usage against a potential device lost criteria to form a loss assessment; (v) providing a notification when the loss assessment exceeds a predetermined value; and (vi) providing location assistance to find the [lost] device using the AI. The loss assessment is based on factors including usage, last location of usage, last known location, current location [if known], expected usage based on the established usage history. In some embodiments, the device reduces battery drain. In some embodiments, the device is wearable. In some embodiments, the notification is sent to a device other than to the "lost" device.

In some embodiments of the present invention, an AI system, based on analysis of current usage vs. device usage patterns, recognizes an imminent loss or misplacement of a device. In response, the AI system proactively sends an alert notification to the user as to the potential loss, coupled with assistance to help locate the device, while the user may still be nearby to the device. The alert notification enables the user (i) to realize the device is about to become lost, and (ii) to look for and find the device promptly. In some embodiments, location assistance includes actions performed by the device itself, for example by causing the device to emit audible and/or visible signals while the device battery is able to provide sufficient power to do so (that is, before the battery runs out). Location assistance may also include actions performed by one or more companion devices that direct the user to the vicinity of the device.

Some embodiments of the present invention provide a means for a user to opt in to any data collection associated with the embodiments. Such data collection is made transparent to the user (that is, permits the user to review, save, copy, and/or delete any and all data collected). Further, some embodiments provide a means for a user to opt out from any portion of, or all data collection associated with the embodiments. Some embodiments protect such collected data via encryption and/or other means to prevent unauthorized access, and/or usage of the data.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer/Mobile device: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

Mobile device: any device, with significant data processing and/or machine readable instruction reading capabilities, that is generally mobile, including, but not limited to: wearable device (worn on a user's person, and/or integrated into an article of clothing or an article commonly carried by a user, such as a handbag, reusable grocery bag, etc.), smartphone, smart watch, and/or computer integrated into a human-powered vehicle or a motor vehicle.

What is claimed is:

1. A computer-implemented method comprising:
tracking usage of a first device, the usage comprising a plurality of events occurring at a plurality of respectively corresponding times, and at a plurality of respectively corresponding locations, to establish a usage history;
generating, by an artificial intelligence system operating in conjunction with a machine learning algorithm, a usage model based on the usage history;
identifying a difference between: (i) a current usage of the first device, and (ii) an expected usage of the first device based on the usage model;
assessing the difference against a potential device lost criterion to form a loss assessment;
determining the loss assessment exceeds a predetermined value; and
in response to determining the loss assessment exceeds the predetermined value, activating a location assistance process;
wherein the loss assessment is based on a factor, associated with the first device, selected from the group consisting of: the current usage of the first device; a last usage location of the first device; a last recorded location of the first device; a current location of the first device; and the expected usage of the first device based on the usage model.

2. The method of claim 1, wherein activating the location assistance process comprises:
providing a signal commanding the first device to (i) enter a state of reduced rate of battery drain, and (ii) activate a location assistance mode.

3. The method of claim 2, wherein the location assistance mode comprises:
performing, by the first device, at least one action selected from the group consisting of:
(i) emitting a series of audible tones on a first periodic basis, (ii) emitting a series of visible light flashes on a second periodic basis, and (iii) emitting a series of radio frequency signals on a third periodic basis.

4. The method of claim 1, wherein activating the location assistance process further comprises:
sending a loss notification signal to a second device.

5. The method of claim 4, wherein the loss notification signal comprises a command directing the second device to perform an action selected from the group consisting of: (i) displaying a visible message on a display device, and (ii) sounding an audible message on a speaker device; and
wherein the visible message, and the audible message, comprise information with respect to the loss assessment.

6. A computer program product for assisting with locating a first device, the computer program product comprising a computer readable storage medium having stored thereon program instructions programmed to perform a method comprising:
tracking usage of a first device, the usage comprising a plurality of events occurring at a plurality of respectively corresponding times, and at a plurality of respectively corresponding locations, to establish a usage history;
generating, by an artificial intelligence system operating in conjunction with a machine learning algorithm, a usage model based on the usage history;
identifying a difference between: (i) a current usage of the first device, and (ii) an expected usage of the first device based on the usage model;
assessing the difference against a potential device lost criterion to form a loss assessment;
determining the loss assessment exceeds a predetermined value; and
in response to determining the loss assessment exceeds the predetermined value, activating a location assistance process;
wherein the loss assessment is based on a factor, associated with the first device, selected from the group consisting of: the current usage of the first device; a last usage location of the first device; a last recorded location of the first device; a current location of the first device; and the expected usage of the first device based on the usage model.

7. The computer program product of claim 6, wherein activating the location assistance process comprises:
providing a signal commanding the first device to (i) enter a state of reduced rate of battery drain, and (ii) activate a location assistance mode.

8. The computer program product of claim 7, wherein the location assistance mode comprises:
performing, by the first device, at least one action selected from the group consisting of:
(i) emitting a series of audible tones on a first periodic basis, (ii) emitting a series of visible light flashes on a second periodic basis, and (iii) emitting a series of radio frequency signals on a third periodic basis.

9. The computer program product of claim 6, wherein activating the location assistance process further comprises:
sending a loss notification signal to a second device.

10. The computer program product of claim 9, wherein the loss notification signal comprises a command directing the second device to perform an action selected from the group consisting of: (i) displaying a visible message on a display device, and (ii) sounding an audible message on a speaker device; and
wherein the visible message, and the audible message, comprise information with respect to the loss assessment.

11. A computer system for assisting with locating a first device, the computer system comprising:
a processor set; and
a computer readable storage medium;
wherein:
the processor set is structured, located, connected and/or programmed to run program instructions stored on the computer readable storage medium; and
the program instructions include instructions programmed to perform a method comprising:
tracking usage of a first device, the usage comprising a plurality of events occurring at a plurality of respectively corresponding times, and at a plurality of respectively corresponding locations, to establish a usage history;
generating, by an artificial intelligence system operating in conjunction with a machine learning algorithm, a usage model based on the usage history;
identifying a difference between: (i) a current usage of the first device, and (ii) an expected usage of the first device based on the usage model;
assessing the difference against a potential device lost criterion to form a loss assessment;
determining the loss assessment exceeds a predetermined value; and
in response to determining the loss assessment exceeds the predetermined value, activating a location assistance process;
wherein the loss assessment is based on a factor, associated with the first device, selected from the group consisting of: the current usage of the first device; a last usage location of the first device; a last recorded location of the first device; a current location of the first device; and the expected usage of the first device based on the usage model.

12. The computer system of claim 11, wherein activating the location assistance process comprises:

providing a signal commanding the first device to (i) enter a state of reduced rate of battery drain, and (ii) activate a location assistance mode.

13. The computer system of claim 12, wherein the location assistance mode comprises:

performing, by the first device, at least one action selected from the group consisting of:
(i) emitting a series of audible tones on a first periodic basis, (ii) emitting a series of visible light flashes on a second periodic basis, and (iii) emitting a series of radio frequency signals on a third periodic basis.

14. The computer system of claim 11, wherein activating the location assistance process further comprises:

sending a loss notification signal to a second device.

15. The computer system of claim 14, wherein the loss notification signal comprises a command directing the second device to perform an action selected from the group consisting of: (i) displaying a visible message on a display device, and (ii) sounding an audible message on a speaker device; and wherein the visible message, and the audible message, comprise information with respect to the loss assessment.

* * * * *